United States Patent Office 3,520,716
Patented July 14, 1970

3,520,716
METHOD OF VAPOR DEPOSITING MULTI-COMPONENT FILM
Hiroaki Okamoto, Tokyo, and Michiyasu Takagi and Tutomu Okutomi, Yokohama-shi, and Iwao Higashinakagawa, Kawasaki-shi, Japan, assignors to Tokyo Shibaura Electric Co., Ltd., Kawasaki-shi, Japan, a corporation of Japan
Filed June 5, 1967, Ser. No. 643,496
Claims priority, application Japan, June 7, 1966, 41/36,278; Apr. 7, 1967, 42/21,832
Int. Cl. C23c 13/02
U.S. Cl. 117—106      2 Claims

ABSTRACT OF THE DISCLOSURE

Vapor deposition is used to form multicomponent films in which the gradient of change of concentration of respective components is linear. Such films may be used to investigate changes in physical or chemical properties in alloys or other mixtures as their compositions are changed. The films are formed when a plurality of containers of different vaporizable substances are disposed in an evacuated vessel, a substrate is disposed above said containers and a shield is provided between the containers and substrate such that penumbrae of said containers are formed in a common region on the substrate whereby a film of constant concentration distribution is deposited on the substrate by evaporating the substances contained in the container.

BACKGROUND OF THE INVENTION

This invention relates to a method of forming a film of a substance of composite composition on a substrate by vapor deposition technique utilized to investigate physical or chemical characteristics of various alloys or mixtures dependent upon variation of the composition thereof, and more particularly to a method of forming such films wherein the gradient of the change of concentration of respective compositions is linear.

According to an already proposed method of vacuum vapor deposition for forming a film in which the composition of a ternary system continuously varies from one side to the other, evaporating sources each containing different ones of three types of substances are positioned at respective apices of an equilateral triangle, a substrate upon which the film is deposited is maintained in parallel with the plane of equilateral triangle at a suitable distance therefrom and the substances contained in said evaporation sources are simultaneously evaporated by electron bombardment. (See Journal of Applied Physics, vol. 36, No. 12, 1965.)

According to this known method because the quantity of one substance deposited on the substrate largely depends upon the distance between the evaporation source and the substrate as well as the angle of impingement or incident angle of vapor, it is difficult to cause the quantity deposited to vary linearly. Consequently the distribution of respective compositions greatly differs from that of the ternary phase diagram represented by triangular coordinates usually employed in the fields of chemistry and metallurgy. This tendency is particularly remarkable where the percentage of the respective composition is close to 100%.

SUMMARY OF THE INVENTION

According to this invention a plurality of different types of evaporation sources are used, respectively containing substances to be vaporized, and the space between these evaporation sources and a substrate upon which a film of composite composition is to be vapor deposited is shielded so as to form penumbrae of respective evaporation sources on the same region of the substrate.

Within the region of penumbrae of the evaporation sources formed on the substrate the quantity of the substance of the film vapor deposited thereon varies substantially linearly from one side to the other. Accordingly if two evaporation sources were utilized, for example, and if the space between these evaporation sources and the substrate were shielded such that the penumbrae of the evaporation sources overlap each other on the substrate the construction of the film formed on the substrate would be such that one side of the film would contain one composition alone, while the other side of the other composition alone, with the consequence that the percentage of one composition would decrease from one side to the other while that of the other composition would increase. Variation of each composition is linear. Thus, such a vapor deposited film could be immediately converted to a phase diagram taking the distance as the parameter.

DESCRIPTION OF THE PREFERRED EMBODIMENTS

Figure 1:
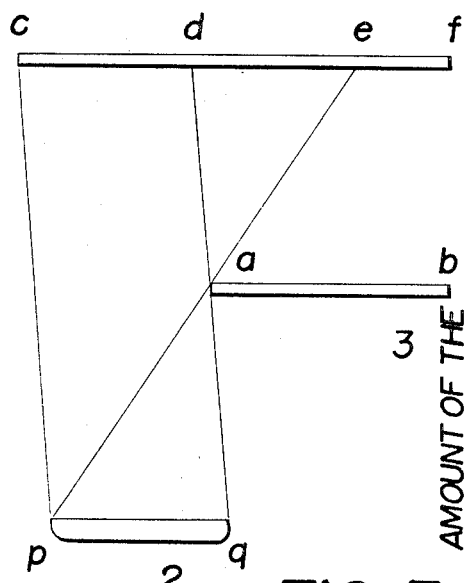
FIG. 1 is a side view illustrating an evaporation source, a substrate upon which a film is to be vapor deposited and a shield provided between them, said FIG. 1 being helpful to explain the principle of this invention.
Figure 2:
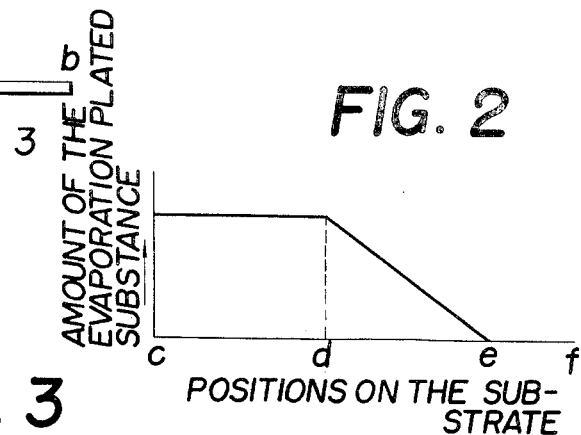
FIG. 2 is a graph to show the position of the vapor deposited film produced by the arrangement shown in FIG. 1 and the quantity of evaporated substance.

In order to aid to understand the principle of the novel method a vapor deposited film will first be considered formed by a conventional vacuum vapor depositive method utilizing an evaporation source, a substrate which are disposed to oppose in the vertical direction and a shield interposed between them. Referring to FIG. 1 of the accompanying drawings, above an evaporation source 2 in the form of an elongated strip is positioned a substrate 4 upon which a vapor deposited film is to be formed, said substrate being in parallel with and spaced from the evaporation source by a suitable distance. A shield 3 having an area enough to cover about half of the substrate as viewed from the evaporation source is disposed in parallel with the substrate in a space between it and the evaporation source. When vapor of a suitable substance is generated under a condition which assures formation of a vapor deposited film on the surface of the substrate 4 opposing the evaporation source, the region $c$–$d$ of the substrate which is not influenced by the shield 3 situated at a position $a$–$b$ will be covered uniformly by the vaporized substance. However in the region between a point $d$ at which an extension of a line $a$–$q$ interconnecting one end $q$ of the evaporation source 2 and one edge $a$ of the shield 3 intersects the substrate and a point $e$ at which an extension of a line $p$–$a$ interconnecting the opposite end $p$ of the evaporation source and said edge $a$ intersects the substrate, the quantity of the deposited substance gradually decreases as the distance from the point $d$ increases until finally to zero at the point $e$. This region between points $d$ and $e$ corresponds to the optical penumbra when the evaporation source 2 is considered as a light source and the surface of the substrate as a plane of projection. Where the distance between the substrate has a plane of projection. Where the distance between the substrate and the evaporation source is sufficiently large when compared with the length $p$–$q$ of the evaporation source, the rate of change of the deposited material will be constant throughout said region. In the region between points $e$ and $f$ corresponding to umbra, no film will be deposited.

Figure 3:
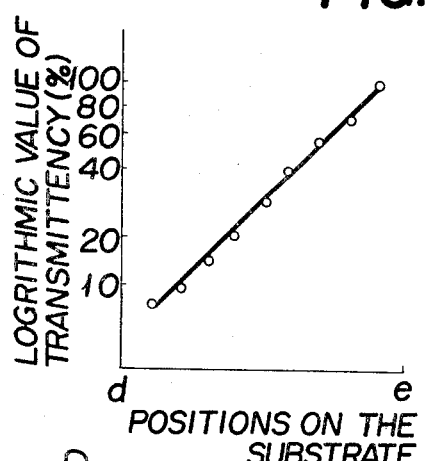
FIG. 3 is a graph to show the relation between the position in the penumbra portion of the vapor deposited film shown in FIG. 2 and the logarithmic value of light transmittency in percent.

The fact that the rate of change of the quantity of vapor deposition is constant in the region of penumbra will become evident from a graph showing the change in the light transmittency shown in FIG. 3. The graph in this figure was plotted from measured values at various points of transmitted light which were obtained by measuring light transmitted through the vapor deposited film by means of a photoelectric multiplier and from it can be clearly noted that the measured values are proportional to the distance from the interface between the umbra and the penumbra of the deposited film. As it is well known that the transmittency is proportional to $e^{-\mu x}$ (where $x$ represents the thickness of the film), and hence the logarithmic value thereof is proportional to the thickness of the film the result shown in FIG. 3 shows that the thickness of the deposited film varies in proportion to the distance from said interface.

This invention is based on the above described principle that, in the penumbra region on the substrate to be formed with a vapor deposited film the quantity of the deposited substance varies linearly from one side to the other of the region stated in another way, according to this invention, a plurality of evaporation sources are employed together with a shield which shields the passage of the evaporated material from these evaporation sources to the substrate such that penumbrae are formed in the same region on the substrate.

Figure 4:
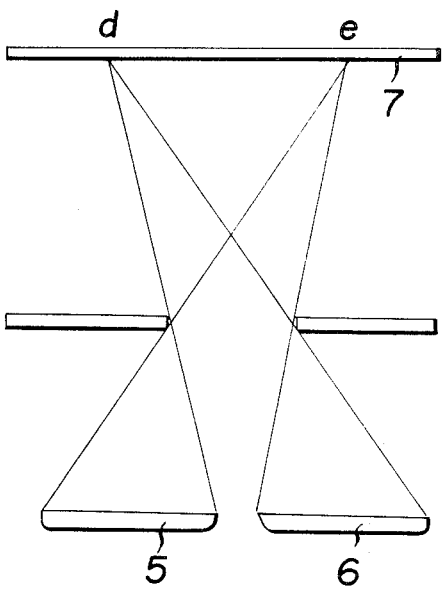
FIG. 4 is a side view illustrating the relative position among evaporation sources, a substrate and a shield interposed therebetween where a vapor deposited film of binary system is formed according to one embodiment of this invention.

One example of forming a vapor deposited film of the binary system in accordance with this invention is illustrated in FIG. 4. In this embodiment, two evaporating sources 5 and 6 are employed each in the form of an elongated boat like container containing different types of substances, for example, Mn and Sn, said evaporating sources being disposed along a straight line on the same surface. Above the evaporating sources 5 and 6 are positioned a flat substrate 7 upon which a thin film is to be deposited, and a shield 8 having a perforation at its center to permit evaporated substances to pass through so as to form the penumbrae of evaporation sources 5 and 6 in the region between points $d$ and $e$ on the lower surface of the substrate. These evaporation sources, substrate and shield are contained in a suitable evacuated vessel, not shown.

Figure 5:
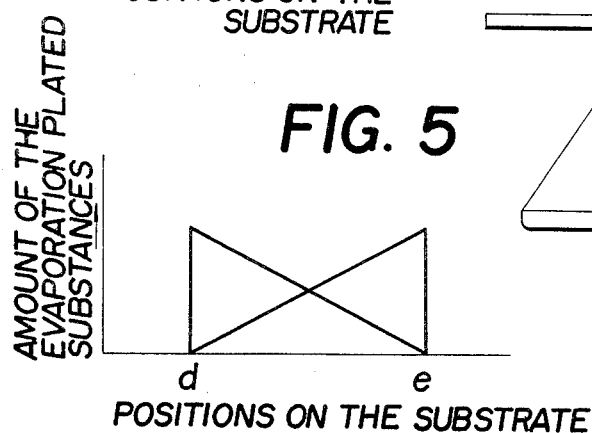
FIG. 5 is a diagram to explain the distribution of thickness of vapor deposited films formed on the substrate according to the embodiment shown in FIG. 4.

When suitably energized, for example, by electric heating, induction heating, arc discharge or by Rayleigh's method or electron beam bombardment, Mn and Sn will be evaporated from sources 5 and 6, respectively and the vapor of these metals will be deposited on the lower surface of the substrate to form a thin film. During this vapor deposition, since the passage of the evaporated substances is intercepted by the shield 8, in accordance with the aforementioned principle, evaporated substances will deposit upon the region between points $d$ and $e$ of the substrate at a predetermined gradient of concentration. The concentration gradient of the deposited substances is shown in FIG. 5 which shows that, the concentration of Sn evaporated from the source 6 is 100% at point $d$ of the substrate 7 and linearly decreases toward point $e$, at which the concentration becomes zero. On the other hand the concentration of Mn evaporated from the source 5 is 100% at point $e$ and decreases toward point $d$ at a constant rate, the concentration at point $d$ being zero.

So long as substances of two evaporation sources evaporate at the same rate, the distribution of two components in the deposited film, as measured along its thickness, will be uniform. However, if both evaporated substances can effect mutual thermal diffusion and fusion, the composition in the direction of thickness of the deposited film would be uniform regardless of the difference in the rates of evaporation of the evaporated substances so that it would be always possible to form vapor deposited film of constant composition as long as the integrated quantity of the evaporated substances is constant. The rate of evaporation of evaporated substances can be selected to any desired value dependent upon the field of use of the deposited film. For example, where the rate of evaporation is selected based upon the ratio of mass the composition of the deposited film would correspond to the ratio of mass. In the same manner, if based upon the molecular weight or atomic weight the composition would correspond to molecular weight or atomic weight, respectively.

In case where respective components of the deposited film can perform mutual thermal diffusion, generally occurs at a temperature considerably lower than the melting points thereof, so that during or after forming the deposited film the substrate may be heated to a temperature at which components of the film can diffuse mutually.

The quantity of the substance deposited on the substrate depends upon such factors as the heating temperature and time of evaporating vaporizable substance, vapor pressure at said temperature, and the surface area thereof so that it is possible to suitably control the evaporation rate of each component when these factors are taken into consideration.

In order to form as far as possible wide penumbrae on the surface of the substrate it is desirable to construct the evaporation source in an elongated form but the source may be circular, square or similar configuration. In order to improve the linearity of the concentration gradient of the film composition, it is desirable to make sharp the edge of the shield which intercepts the passage of the evaporated substance for projecting a penumbrae to the substrate from the evaporation source.

Figure 6:
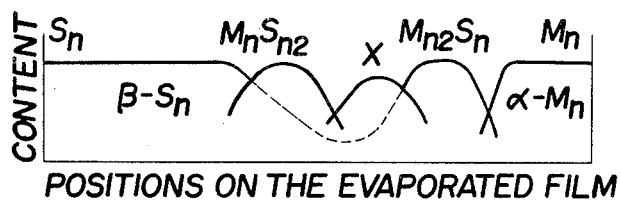
FIG. 6 is a diagram to show the relation between the position of the vapor deposited film formed according to the embodiment shown in FIG. 4 and the position of the film.

Following are the results of experiments wherein films of binary system of Mn and Sn were vapor deposited on the substrate by the arrangement shown in FIG. 4. Mn and Sn were respectively put in two molybdenum boats, 92 mm. long, and 6 mm. wide, and these evaporation sources were placed along a straight line, but spaced by 10 mm., on a horizontal base. A substrate of glass plate was placed horizontally above the evaporation sources and spaced therefrom by a distance of 210 mm., and a shield having a perforation, 40 mm. wide, and 100 mm. long, was placed beneath the substrate at a distance of 90 mm. to make penumbrae for the evaporated substances. These component elements were contained in a suitable vessel evacuated to $10^{-6}$ mm. Hg. Prior to vapor deposition the substrate was heated to 300° C. and both evaporation sources were heated for 30 minutes by electric heaters. After interruption of the heating of the evaporation sources, the substrate was maintained at that temperature for 30 minutes, then cooled to a room temperature, and removed from the vacuum vessel after breaking the vacuum thereof. Major portion of the surface of the film deposited on the substrate had a mirror-like luster, but was silver white where the content of Sn was large. The result of an analysis of element distribution obtained by X-ray diffraction measurement and shown in FIG. 6, shows the presence of $\beta$-Sn, $MnSn_2$, $Mn_2Sn$, and $\alpha$-Mn which are shown from left to right. Interfaces between respective phases are considerably wide. While the curve indicated by $x$ can not be found in ASTM cards, it was supposd that this was caused by the presence of an Sn-Mn alloy of unknown phase.

Figure 7:
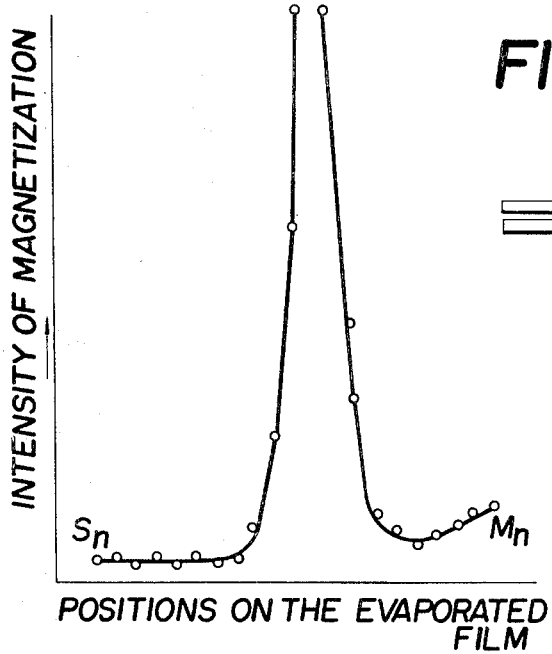
FIG. 7 is a graph representing the relation between the position of the vapor deposited film formed according to the embodiment shown in FIG. 4 and the intensity of magnetization.

Qualitative analysis of distribution of the deposited film produced by this experiment was made by utilizing an astatic magnetometer of high sensitivity and the results obtained are shown by the magnetization curve shown in FIG. 7. As can be clearly noted from this curve, the deposited film showed strong magnetism near the central portions and portions adjacent thereto, which shows that concentration distribution of the composition of the deposited film varies continuously and that alloys are formed within the film.

Chemical property of the deposited film obtained by this experiment was also investigated. Upon heating under a reduced pressure of $10^{-2}$ mm. Hg, the color of the portion of the film containing higher percentages of Mn component was changed to blue but color of the remaining portion did not change.

Figure 8:
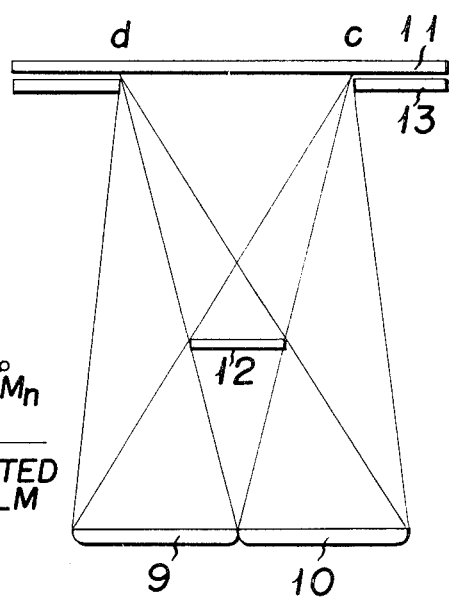
FIG. 8 is a side view showing the relation among evaporation sources, a substrate and a shield adapted to form a vapor deposited film of the binary system according to this invention.
Figure 9:
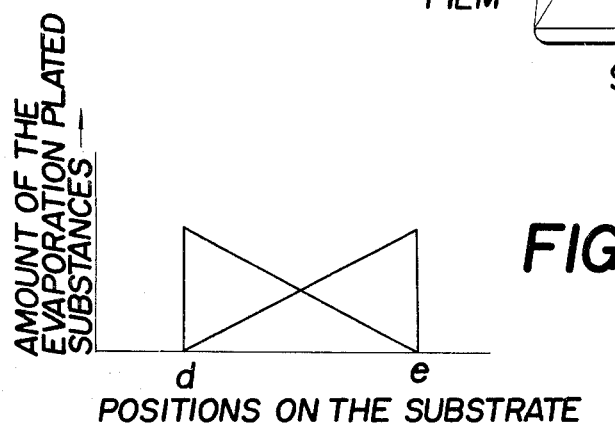
FIG. 9 is a graph to show the thickness distribution of a vapor deposited film formed in accordance with the embodiment shown in FIG. 8.

In forming vapor deposited film of the binary system according to the method of this invention, as shown in FIG. 8, a shield 12 may be positioned at the center of the passage of the evaporated substances extending between evaporation sources 9 and 10 and a substrate 11 which is masked by a mask 13 except the portion on which penumbrae of the evaporation sources are to be formed. As shown in FIG. 9, a deposited film of the binary system in which the composition varies continuously and linearly from one side to the other of the film is also formed except that the distribution of the component at the interfaces $d$ and $e$ of the penumbrae on the substrate is opposite to that obtained by the arrangement shown in FIG. 4.

Figure 10:
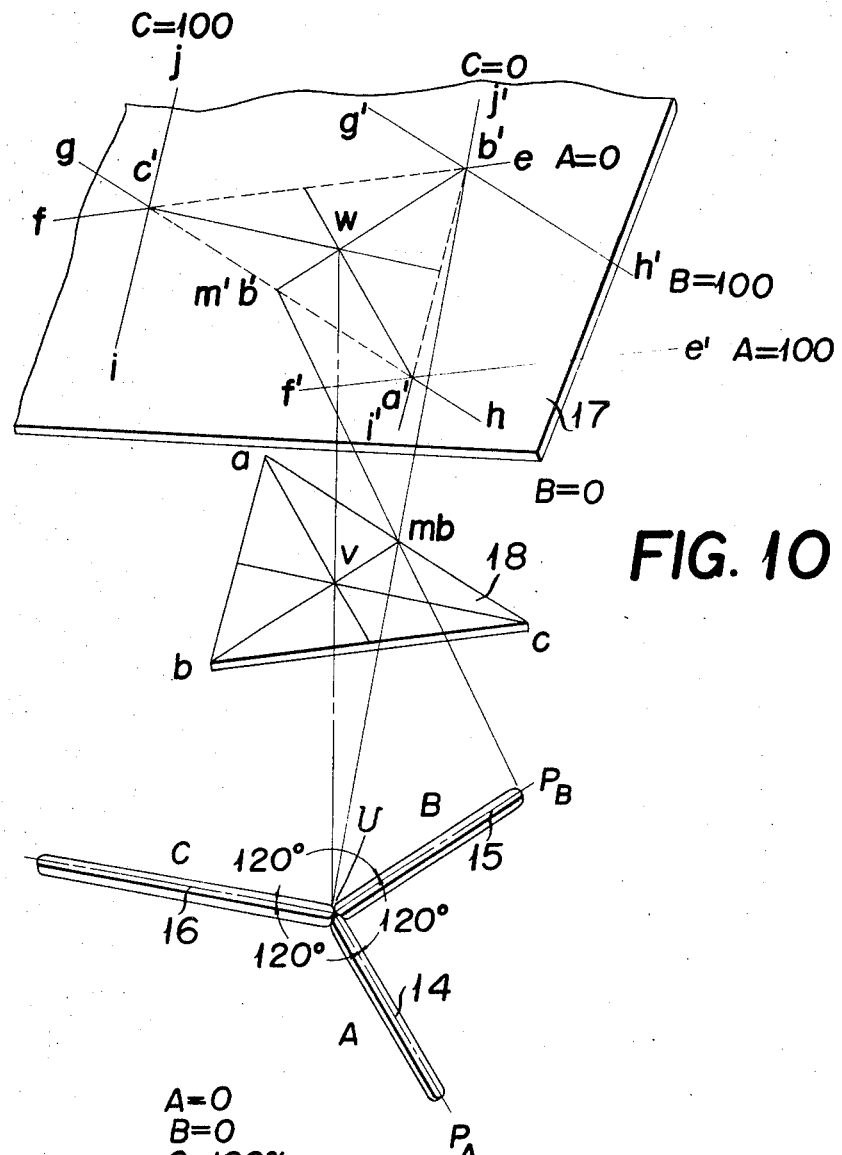
FIG. 10 is a perspective view showing the relation among evaporation sources, a substrate and a shield interposed in a space therebetween where a vapor deposited film of the ternary system is formed in accordance with the method of this invention.

FIG. 10 shows one example of the arrangement for forming a vapor deposited film of the ternary system according to this invention.

Three elongated evaporation sources 14, 15 and 16 are radially arranged on the same plane at the same angular spacing. These evaporation sources contain different vaporizable substances A, B and C, respectively. Above these evaporation sources are arranged a substrate 17 in parallel therewith and an equilateral triangular shield 18 which is located between the substrate and the evaporation sources with each altitude of the triangular shield being parallel to one of said vessels, e.g., altitude $b-mb$ is parallel to vessel B. With this arrangement, respective penumbrae of three evaporation sources are formed on the lower surface of the substrate in an equilateral triangular region having its center at W on a line which interconnects the center U of three evaporation sources and the center V of shield 18.

In this arrangement vapors generated from vaporized substances contained in evaporation sources are deposited on the lower surface of the substrate. For example, the vapor of the vaporizable substance generated by the evaporation on the source 15 will be intercepted in its passage by one side $a-c$ of the shield 18 and then deposited on the substrate 17 to form a penumbra in a region defined by two straight lines $g-h$ and $g'-h'$. The concentration of the deposited substance B decreases at a constant gradient from one apex B of an equilateral triangle on the substrate forward to a point $m'b'$ at which a straight line interconnecting the outer end P$b$ of the evaporation source 15 and the center of a side $a-c$ of the shield 18 intersects the substrate. Similarly vaporizable substances A and C respectively form penumbrae in regions defined respectively by two straight lines $e-f$ and $e'-f'$, and $i-j$ and $i'-j'$. Consequently the film formed in an equilateral triangle $a'b'c'$ on the substrate 17 contains 100% of component of A and zero percent of components B and C at the apex $a'$. Whereas at the apex $b'$ the component B is 100% and other components A and C are respectively zero percent at the apex $c'$ the component $c$ is 100% and the components A and B are zero percent. Further, the concentration distribution is such that each component linearly decreases from its apex to the opposing side. Accordingly this concentration distribution is equivalent to the commonly used triangular coordinates.

In this embodiment should evaporation sources be spaced from each other, the width of the penumbrae formed on the substrate will be decreased but again a vapor deposited film can be formed having a concentration distribution correctly corresponding to triangular coordinates.

Figure 12:
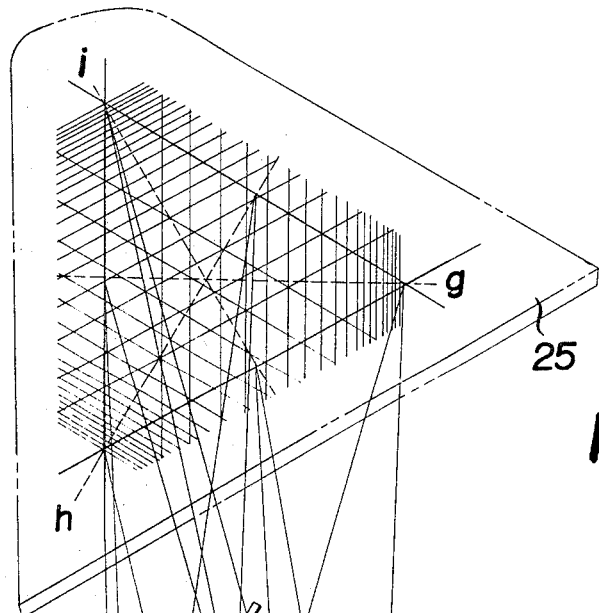
FIG. 12 is a perspective view showing the relation among evaporation sources, a substrate and a shield of a modified embodiment of this invention adapted to form a vapor deposited film of the ternary system.
Figure 13:
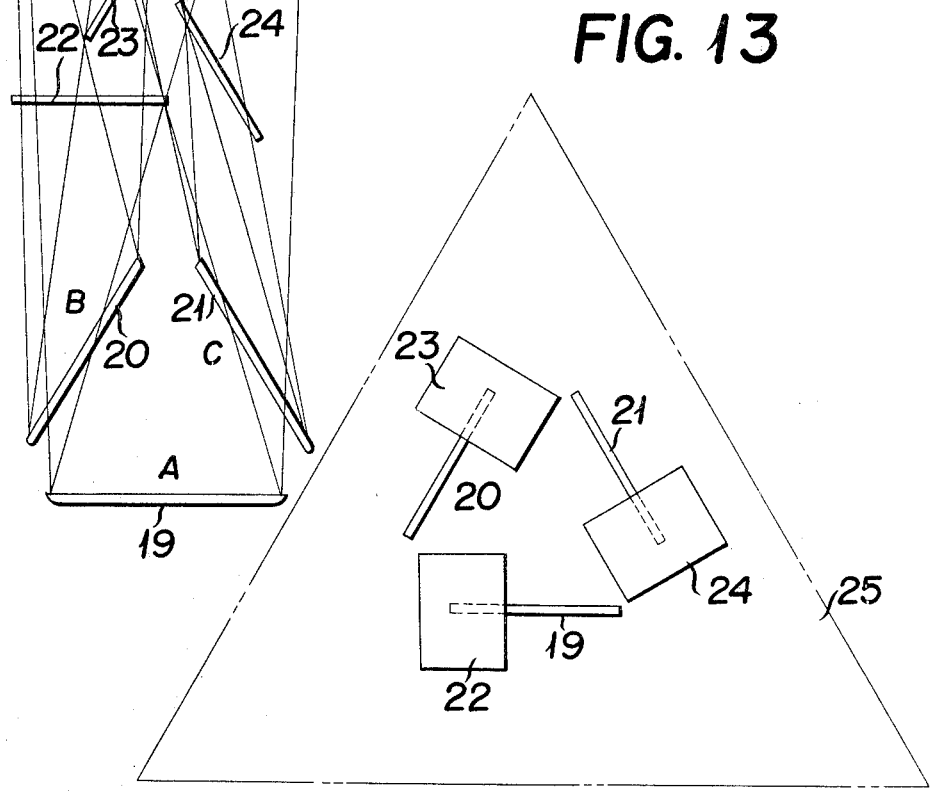
FIG. 13 is a plan view to show the relative arrangement of the shield, substrate and evaporation sources of the embodiment shown in FIG. 12.

FIGS. 12 and 13 illustrate a modified arrangement of evaporation sources, shields and a substrate adapted to form a deposited film of the ternary system according to this invention.

More particularly, three evaporation sources 19, 20 and 21 are arranged to form an equilateral triangle and three shields 22, 23 and 24 are provided respectively above evaporation sources. The relative arrangement among shields, a substrate 25 positioned thereabove and evaporation sources is best shown in FIG. 13. Where three evaporation sources are disposed in an equilateral triangular configuration in this manner, it is possible to increase their length by about 50% when compared with the radial arrangement, thus enabling more efficient utilization of the limited space in the evacuated vessel. In addition, where electric heaters are used for heating evaporation sources, limitations upon terminals of the heaters can be elleviated. Position and size of the shields mounted above these evaporation sources can be suitably selected dependent upon the distance between sources and the substrate, or the area of the deposited film to be obtained.

Figure 11:
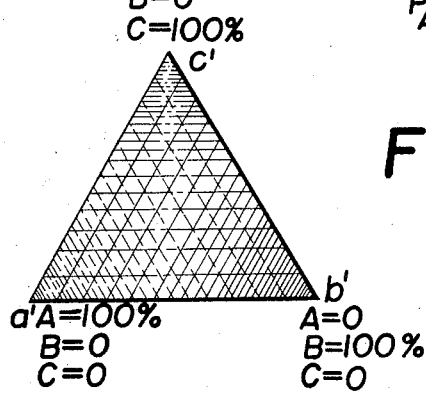
FIG. 11 is a ternary phase diagram showing the distribution of the composition of the vapor deposited film obtained by the arrangement shown in FIG. 10.

The passages of vapors of three vaporizable substances A, B and C generated from evaporation sources 19, 20 and 21 are intercepted so as to form penumbrae on a substrate 25, and a deposited film having a concentration distribution shown in FIG. 11 will be formed in an equilateral triangle $ghi$ defined by lines interconnecting interfaces between respective penumbrae.

Figure 14:
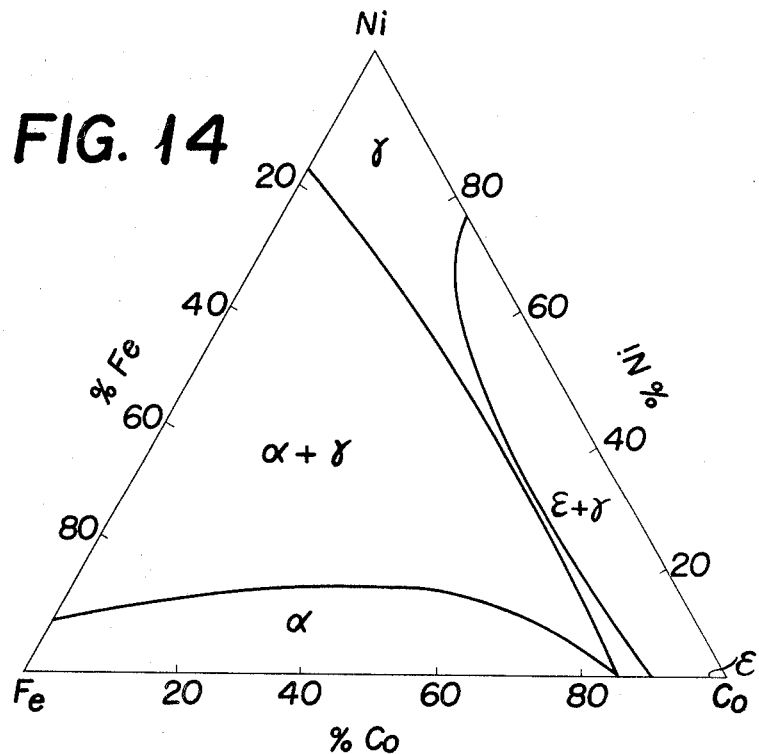
FIG. 14 is a phase diagram representing the distribution of compositions of the vapor deposited film obtained by the embodiment shown in FIGS. 12 and 13.

By using the arrangement shown in FIG. 12, an experiment was made wherein use was made of a straight iron piece, granular cobalt and a straight nickel piece as the vaporizable substances. The distance between evaporation sources and the substrate was selected to be 240 mm., and that between evaporation sources and shields to be 160 mm. All component elements were contained in an evacuated vessel. Vapor deposition was carried out under a reduced pressure of $10^{-5}$ mm. Hg, and by simultaneously heating respective evaporation sources for 5 seconds. During deposition process, the substrate was maintained at a temperature of 200° C. FIG. 14 represents the distribution of the deposited film determined by X-ray diffraction. FIG. 14 also shows that the distribution shown therein well coincides with the already established equilibrium diagram of Fe—Ni—CO system except that a pure $\beta$-phase appears slightly near the portion of 100% cobalt and that the region of a $\alpha+\beta$-phase is slightly wider.

Figure 15:
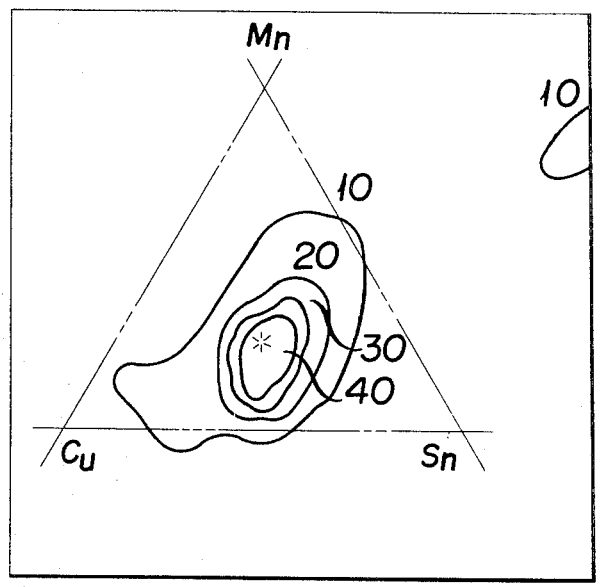
FIG. 15 is a diagram to show the distribution of the relative intensity of magnetization of a vapor deposited film of the ternary system obtained by another modification of this invention.

Further, with the arrangement shown in FIG. 12, another experiment was made wherein a vapor deposited film was formed by using pure copper in the form of a wire, granular tin and electrolytic manganese powder as the vaporizable substances. In this experiment, the distance between evaporation sources and the substrate was selected to be 200 mm. and that between evaporation sources and the shields to be 131 mm. The substrate was heated to 200° C. and the vapor deposition was carried out under a reduced pressure of $5 \times 10^{-6}$ mm. Hg. After deposition, the substrate was further heated to 350° C. and then cooled. The intensity of magnetization of the film deposited on one surface of the substrate was measured by means of a magnetometer of high sensitivity and the results were plotted in FIG. 15. This measurement was made by positioning a magnet having a width of 3 mm., a length of 25 mm. and a thickness of 5 mm., of the magnetometer at a position spaced by 25 mm. from the deposited film. Numerals shown in FIG. 15 designate relative intensities of magnetization and the position indicated by a symbol * represents the position corresponding to the composition $Cu_2MnSn$ described in "Ferromagnestism" (D. Van Nostrand Co., 1951), by R. M. Bozoroth. As can be clearly noted from this figure, the vapor deposited film of the ternary system formed in accordance with this invention contains $Cu_2MnSn$ in the range represented by the relative value of 40, which nearly coincides with the phase diagram proposed by Bozoroth. This fact was confirmed by X-ray diffraction the film formed outside a triangle shown by dot and dash lines, represents a film of binary system of Mn-Sn having a relative intensity of magnetization of 10.

It will be understood that vapor deposited films of quaternary or more higher systems can also be formed by applying the above described principle of this invention. Further, one component may be firstly deposited on the entire surface of the substrate and then other components may be deposited thereon by the same method described hereinabove.

What is claimed is:

1. A method of forming on a substrate a vapor deposited film including a regular triangular area which consists of a ternary system and substantially corresponds to a ternary diagram thereof, comprising; arranging (a) three elongated vessels in a plane, said vessels containing different vaporizable substances and being so arranged as to fall on the lines radially extending from a central point at an equal angle, (b) a regular triangular shield, and (c) a substrate having a substantially plane surface, said shield being interposed between said vessels and said substrate, each of the gravity centers of the triangles formed by said shield and said triangular area of said film being positioned on a perpendicular line extending through said central point, each altitude of said triangular shield being parallel to one of said vessels, the middle point of any side of said shield being laid on a line connecting the middle point of a side of said triangular area with the outer end of the corresponding vessel; and simultaneously evaporating said vaporizable substances from said vessels.

2. A method according to claim 1 wherein said substrate is heated to cause said film deposited on the surface thereof to effect thermal diffusion of the composition in the direction of the thickness thereof.

References Cited

UNITED STATES PATENTS

| 2,676,114 | 4/1954 | Barkley | 117—106 X |
| 2,938,816 | 5/1960 | Gunther | 117—212 |
| 2,994,621 | 8/1961 | Hugle et al. | 117—212 X |
| 3,171,017 | 2/1965 | Siddall et al. | 118—49.5 X |
| 3,211,128 | 10/1965 | Potter et al. | 118—49.1 |
| 3,326,718 | 6/1967 | Dill | 117—107 X |

OTHER REFERENCES

Kennedy et al., Journal of Applied Physics, vol. 36, No. 12, December 1965, pp. 3808 to 3810.

ALFRED L. LEAVITT, Primary Examiner

A. M. GRIMALDI, Assistant Examiner

U.S. Cl. X.R.

117—38, 107; 118—48